US006981200B2

(12) United States Patent
Maung et al.

(10) Patent No.: US 6,981,200 B2
(45) Date of Patent: Dec. 27, 2005

(54) INTERCONNECT SYSTEM WITH ERROR CORRECTION

(75) Inventors: Edward Aung Kyi Maung, Ottawa (CA); Bijan Raahemi, Ottawa (CA); Thomas George Zboril, Stittsville (CA); Kizito Gysbertus Antonius Van Asten, Kanata (CA)

(73) Assignee: Tropic Networks Inc., Kanata (CA)

( * ) Notice: Subject to any disclaimer, the term of this patent is extended or adjusted under 35 U.S.C. 154(b) by 621 days.

(21) Appl. No.: 10/004,441

(22) Filed: Dec. 5, 2001

(65) Prior Publication Data

US 2003/0051204 A1    Mar. 13, 2003

Related U.S. Application Data

(60) Provisional application No. 60/317,938, filed on Sep. 10, 2001.

(30) Foreign Application Priority Data

Nov. 30, 2001  (CA)  .................................. 2364072

(51) Int. Cl.[7] .......................................... H03M 13/00
(52) U.S. Cl. ..................................... 714/781; 714/785
(58) Field of Search ............................. 714/758, 801, 714/746, 780, 781, 785, 752

(56) References Cited

U.S. PATENT DOCUMENTS 6,026,506 A * 2/2000 Anderson et al. ........... 714/746

6,389,572 B1 * 5/2002 Garrabrant et al. ......... 714/780
2002/0053062 A1 * 5/2002 Szymanski .................. 714/801

OTHER PUBLICATIONS

Widmer, A.X., et al, "A DC-Balanced, Partitioned-Block, 8B/10B Transmission Code", IBM Journal of Research and Development, vol. 27, No. 5, Sep. 1983.
ITU-T, Telecommunication Standardization Sector of ITU, Series V: Data Communication Over the Telephone Network (Error control) Error-correcting procedures for DCEs using asynchronous-to-synchronous conversion, ITU-T Recommendation V. 42 (Oct. 1996).

* cited by examiner

Primary Examiner—Albert Decady
Assistant Examiner—Dipakkumar Gandhi
(74) Attorney, Agent, or Firm—Victoria Donnelly

(57) ABSTRACT

A method for transmission of digital data in a form of data packets through links carrying data packets with error correction, includes the steps of enveloping a sent packet data, first with an error detection scheme, and secondly with an error correction scheme. The error correction applies to both the sent packet data and to the error detection field. If an error in either of these fields occurs, the error correction scheme attempts to correct it. Error correction may fail in which case the packet is dropped. If error correction does not fail, there is still a possibility that there was an error which error correction did not correct correctly, or did not detect at all because the power of the correction scheme was exceeded. In these cases, the error detection scheme provides a method or means to detect such errors and drop the packet. Corresponding interconnect system with error correction, encode and decode for such are also provided.

43 Claims, 9 Drawing Sheets

|  | COLUMN 0 | | | | | | | | COLUMN 8 |
|---|---|---|---|---|---|---|---|---|---|
| ROW 0 | B0 | B8 | B16 | B24 | B32 | B40 | B48 | B56 | B64 |
| | B1 | B9 | B17 | B25 | B33 | B41 | B49 | B57 | B65 |
| | B2 | B10 | B18 | B26 | B34 | B42 | B50 | B58 | |
| | B3 | B11 | B19 | B27 | B35 | B43 | B51 | B59 | |
| | B4 | B12 | B20 | B28 | B36 | B44 | B52 | B60 | |
| | B5 | B13 | B21 | B29 | B37 | B45 | B53 | B61 | |
| | B6 | B14 | B22 | B30 | B38 | B46 | B54 | B62 | |
| ROW 7 | B7 | B15 | B23 | B31 | B39 | B47 | B55 | B63 | |

MEMORY LAYOUT OF PROTECTED FIELD DATA

FIG. 6

| D - BITS | d1 | d2 | d3 | d4 | d5 | d6 | d7 | d8 |
|---|---|---|---|---|---|---|---|---|

| | | | | | | | | |
|---|---|---|---|---|---|---|---|---|
| SELECT = 0 | d1 | d2 | d3 | d4 | d5 | d6 | d7 | d8 | 0 |
| SELECT = 1 | d2 | d3 | d4 | d5 | d6 | d7 | d8 | 0 | 0 |
| SELECT = 2 | d3 | d4 | d5 | d6 | d7 | d8 | 0 | 0 | 0 |
| SELECT = 3 | d4 | d5 | d6 | d7 | d8 | 0 | 0 | 0 | d1 |
| SELECT = 4 | d5 | d6 | d7 | d8 | 0 | 0 | 0 | d1 | d2 |
| SELECT = 5 | d6 | d7 | d8 | 0 | 0 | 0 | d1 | d2 | d3 |
| SELECT = 6 | d7 | d8 | 0 | 0 | 0 | d1 | d2 | d3 | d4 |
| SELECT = 7 | d8 | 0 | 0 | 0 | d1 | d2 | d3 | d4 | d5 |
| SELECT = 8 | 0 | 0 | 0 | d1 | d2 | d3 | d4 | d5 | d6 |

CODE MAPPER

FIG. 8

INTERCONNECT SYSTEM WITH ERROR CORRECTION

This application claims priority from U.S. Provisional Patent Application Ser. No. 60/317,938 to Maung et al., entitled "Interconnect System with Error correction", and filed on 10 Sep. 2001. The invention relates generally to interconnect systems, and in particular to such systems which have links carrying data packets with error correction.

BACKGROUND OF THE INVENTION

Field of the Invention

Transmission of digital data over transmission links in a form of packets can be affected by random bit errors due to a variety of factors, e.g. Gaussian noise.

Years ago short reach interconnect systems, e.g. interconnect systems within buildings, campuses or other confined areas, used relatively low speed links and were generally designed so as to have a low error rate and preferably not to have link errors under normal operating conditions. However, nowadays, as the speed of short interconnect links increase, the link attenuation also increases, and the effect of Gaussian noise combined with the increased number of transmitted bits per time, can result in a random bit error rate, which is no longer negligible.

A commonly used method to detect errors in a packet is to append an error checking code to the packet data. A "checksum" is a type of error checking code, which is widely used in internet protocols, see e.g. an Internet Engineering Task Force (IETF) document RFC 1071. A Cyclic Redundancy Code (CRC) is another type of error checking code used in telecommunications protocols and applications, see e.g. International Telecommunications Union (ITU) standard document "Error-correcting procedures for DCEs using asynchronous-to-synchronous conversion" of October 1996, where a 16-bit CRC and a 32-bit CRC are described.

After the error has been detected, one of the following approaches may be applied.

In one approach, the packets, which appear to contain errors, are dropped, and the sender is asked for re-transmission of the corresponding packets. An example of a protocol, which relies on retransmission of lost packets, is the Internet Transmission Control Protocol (TCP), see e.g. Internet Engineering Task Force (IETF) Request For Comment (RFC) 793. The methods which recover lost or dropped packets automatically require a stream of packets to retransmit, and suffer from a long additional delay since a number of packets must be received before recovery can take place.

According to another approach, the packets containing errors are dropped without re-transmission. An example of the protocol, which does not provide for the re-transmission of lost packets, is the Internet User Datagram Protocol (UDP), see IETF RFC 768. Although this approach may be acceptable for some applications as long as the frequency of the packet loss is small, it is not suitable for many other applications where the loss of data is unacceptable.

In yet another approach, the errors are corrected when discovered. A known method used in error correction is to encode the transmitted signal with a Forward Error Correction (FEC) code, also referred to simply as Error Correcting Code (ECC). Forward error correction can be applied to a link independently of the data format employed on the link and combined with the required packet format. Such FEC methods are commonly used for links, which have a high inherent bit error rate, such as radio or satellite links. There are many mathematical algorithms on which the Forward Error Correction can be based, for example, Reed-Solomon (RS) codes, see e.g. U.S. Pat. No. 5,991,913 to Koyama et al., and N-dimensional parity codes, see e.g. U.S. Pat. No. 4,205,324 issued to Patel, and Master's Thesis by A. Hunt, "Hyper-codes: High-performance Low-complexity Error-correcting Codes", Carleton University, Ottawa, Canada, defended Mar. 25, 1998. Various Parity codes have been used in applications as diverse as CD-ROM (Compact Disk Read-Only-Memory), tape storage systems and digital wireless communications.

Unfortunately, most of the above cited methods of error correction have been developed for high error bit rates and long reach interconnect systems, and therefore are complex and inefficient to be used on links which typically have a lower error rate.

Therefore there is a need for the development of a method for error correction, which would avoid the above mentioned drawbacks and would be suitable for high speed links.

SUMMARY OF THE INVENTION

It is therefore an object of the present invention to provide an interconnect system and a method for transmitting data in a form of packets through transmission links which carry data packets with error correction and which would be suitable for high speed links.

According to one aspect of the invention there is provided a method for transmitting digital data in a form of packets through a transmission medium with error correction, each packet being formatted as a fixed number of data words, each data word having more than 1 bit, the method comprising the steps of:

encoding a sent data packet to form a sent encoded data packet, including:

applying an error detection scheme to the sent data packet to add a first error detection field to the packet to form a first Protected Packet;

applying an error correction scheme to the first Protected Packet to add a first error correction field to said first Protected Packet to form the Sent Encoded Packet;

transmitting the sent encoded data packet through the transmission medium, which may introduce errors into the packet during the transmission, the Sent Encoded Packet being received as a Received Encoded Packet at the output of the transmission medium, the Received Encoded Packet including a second Protected Packet and a second error correction field, the second Protected Packet including a second data packet and a second error detection field; and decoding the Received Encoded Packet to recover a copy of the sent data packet.

Advantageously, the step of decoding comprises:

correcting errors, if any, in the Received Encoded Packet to recover a third Protected Packet, the third Protected Packet having a third data packet and a third detection field, the third Protected Packet including fields from the second Protected Packet with the errors being corrected, the third Protected Packet being a copy of the first Protected Packet within the power of the correction scheme.

Beneficially, the step of decoding further comprises:

determining the integrity of the third Protected Packet; and if the integrity is confirmed, recovering a recovered data packet from the third Protected Packet, the recovered data packet being a copy of the sent data packet within the power of the correction and detection schemes.

Conveniently, the step of correcting errors comprises correcting one or more errors occurring in a single data word of the Sent Encoded Packet only.

Optionally, the step of decoding may comprise generating a packet drop indicator signal if the power of the correction scheme is exceeded and the correction scheme cannot correct errors. Alternatively, the step of decoding may comprise generating a packet drop indicator signal if the integrity is not confirmed.

Advantageously, the step of applying the error correction scheme to the first Protected Packet to add the first error correction field comprises applying an algebraic function to the data words in the first Protected Packet to generate the first error correction field. Conveniently, the step of correcting may comprise the following steps:

applying an algebraic function to the data words in the second Protected Packet to generate a third error correction field;

applying a bitwise exclusive OR function to the second and third correction fields to obtain an error syndrome value;

if an error occurred, identifying the data word which has the error and obtaining a bit pattern of the error from the error syndrome value; and correcting the identified word in the second Protected Packet by using the obtained bit pattern to obtain the third Protected Packet.

Beneficially, the step of applying the algebraic function comprises performing a N-dimensional parity calculation, e.g. a 3D (three dimensional) parity calculation.

In a method described above, the step of applying the error detection scheme may comprise applying an algebraic function to the data words in the sent data packet to generate the first detection field, e.g. applying one or more of the following functions: CRC-16, CRC-32 and a checksum.

Beneficially, the step of determining the integrity comprises:

applying said error detection scheme to the third data packet to generate a fourth detection field;

comparing the third and fourth detection fields;

confirming the integrity of the third Protected Packet, if the third and fourth detection fields are equal.

Conveniently, the transmitting of data according to the method is performed so that each data word is an 8-bit byte, and each data packet has not more than 64 bytes.

Beneficially, the transmitting of the sent encoded data packet through the transmission medium comprises transmitting said packet through the transmission link which comprises transmitting said packet through the link which provides line coding of the transmitted data, e.g. 8B/10B line coding.

According to another aspect of the invention there is provided a system for transmitting digital data in a form of packets through a transmission medium with error correction, each packet being formatted as a fixed number of data words, each data word having more than 1 bit, the system comprising:

means for encoding a sent data packet to form a sent encoded data packet, including:

means for applying an error detection scheme to the sent data packet to add a first error detection field to the packet to form a first Protected Packet;

means for applying an error correction scheme to the first Protected Packet to add a first error correction field to said first Protected Packet to form the Sent Encoded Packet;

means for transmitting the sent encoded data packet through the transmission medium, which may introduce errors into the packet during the transmission, the Sent Encoded Packet being received as a Received Encoded Packet at the output of the transmission medium, the Received Encoded Packet including a second Protected Packet and a second error correction field, the second Protected Packet including a second data packet and a second error detection field; and means for decoding the Received Encoded Packet to recover a copy of the sent data packet.

In the system described above, means for decoding comprises:

means for correcting errors in the Received Encoded Packet to recover a third Protected Packet, the third Protected Packet having a third data packet and a third detection field, the third Protected Packet including fields from the second Protected Packet with the errors being corrected, the third Protected Packet being a copy of the first Protected Packet within the power of the correction scheme.

Conveniently, the means for decoding further comprises:

means for determining the integrity of the third Protected Packet; and means for recovering a recovered data packet from the third Protected Packet, the recovered data packet being a copy of the sent data packet within the power of the correction and detection schemes.

Conveniently, the means for correcting errors may comprise means for correcting one or more errors occurring in a single data word of the Sent Encoded Packet only.

Optionally, the means for decoding may comprise means for generating a packet drop indicator signal if the power of the correction scheme is exceeded and the correction scheme cannot correct errors. Alternatively, the means for decoding may comprise means for generating a packet drop indicator signal if the integrity of the third Protected Packet is not confirmed.

Advantageously, the means for applying the error correction scheme to the first Protected Packet to add the first error correction field comprises means for applying an algebraic function to the data words in the first Protected Packet to generate the first error correction field.

Beneficially, the means for correcting comprises:

means for applying an algebraic function to the data words in the second Protected Packet to generate a third error correction field;

means for applying a bitwise exclusive OR function to the second and third correction fields to obtain an error syndrome value;

means for identifying the data word which has the error, if any, and means for obtaining a bit pattern of the error from the error syndrome value; and means for correcting the identified word in the second Protected Packet by using the obtained bit pattern to obtain the third Protected Packet.

Advantageously, the means for applying the algebraic function comprises means for performing a N-dimensional parity calculation, e.g. means for performing a 3D (three dimensional) parity calculation.

In the system described above, the means for applying the error detection scheme beneficially comprises means for applying an algebraic function to the data words in the sent data packet to generate the first detection field, e.g. means for applying one or more of the following functions: CRC-16, CRC-32 and a checksum. The means for determining the integrity comprises:

means for applying said error detection scheme to the third data packet to generate a fourth detection field;

means for comparing the third and fourth detection fields; and means for confirming the integrity of the third Protected Packet, if the third and fourth detection fields are equal.

Beneficially, the system is suitable for the transmission of data packets having data words which are 8-bit byte each, each data packet having not more than 64 bytes.

Advantageously, the system includes the transmission medium which is a transmission link, e.g. the link comprising a line encoder for transforming each "p" bits of the sent encoded data packets into "q" bits, "q" being not less than "p", and a line decoder for transforming each of the received "q" bits into "p" bits of the received encoded data packets. Conveniently, "p"=8 and "q"=10.

According to another aspect of the invention there is provided an encoder for a transmission system for transmitting digital data in a form of packets through a transmission medium with error correction, comprising:

means for adding an error detection field to a sent data packet to form a Protected Packet;

means for adding an error correction field to the Protected Packet to form an encoded packet;

means for sending the encoded packet to the transmission medium.

Advantageously, the means for adding the error detection field of the encoder comprises means for adding the error detection field according to one the schemes: CRC-16, CRC-32 and checksum. Conveniently, the means for adding the error correction field comprises means for applying 3D parity calculation to the Protected Packet.

According to yet another aspect of the invention there is provided a decoder for a transmission system for transmitting digital data in a form of packets through a transmission medium with error correction, the decoder receiving comprising:

means for receiving a Received Encoded Packet from the transmission medium, the Received Encoded Packet being the encoded packet encoded by the encoder of claim 35 and transmitted through the transmission medium, the Received Encoded Packet including a Protected Packet and an error correction field;

means for correcting errors, if any, in the Received Encoded Packet to recover a corrected Protected Packet which includes fields from the Protected Packet with the errors being corrected;

means for determining integrity of the corrected Protected Packet; and means for recovering a corrected data packet from the corrected Protected Packet, the corrected data packet being a copy of the sent data packet.

The system and method described above provide a simple and efficient approach to the error free transmission of data packets through the links, which may introduce errors into the packets. The invented approach does not require re-transmission of packets and therefore does not introduce delays to the delivery of packets, it requires fewer hardware resources than many existing solutions, and is suitable for high speed transmission links.

BRIEF DESCRIPTION OF THE DRAWINGS

The invention will now be described in greater detail with reference to the attached drawings, in which:

FIG. 6 shows a layout of packet data in a memory;

FIG. 8 is an illustration of a code mapper used in the preferred embodiment.

DETAILED DESCRIPTION OF THE PREFERRED EMBODIMENTS

Figure 1:
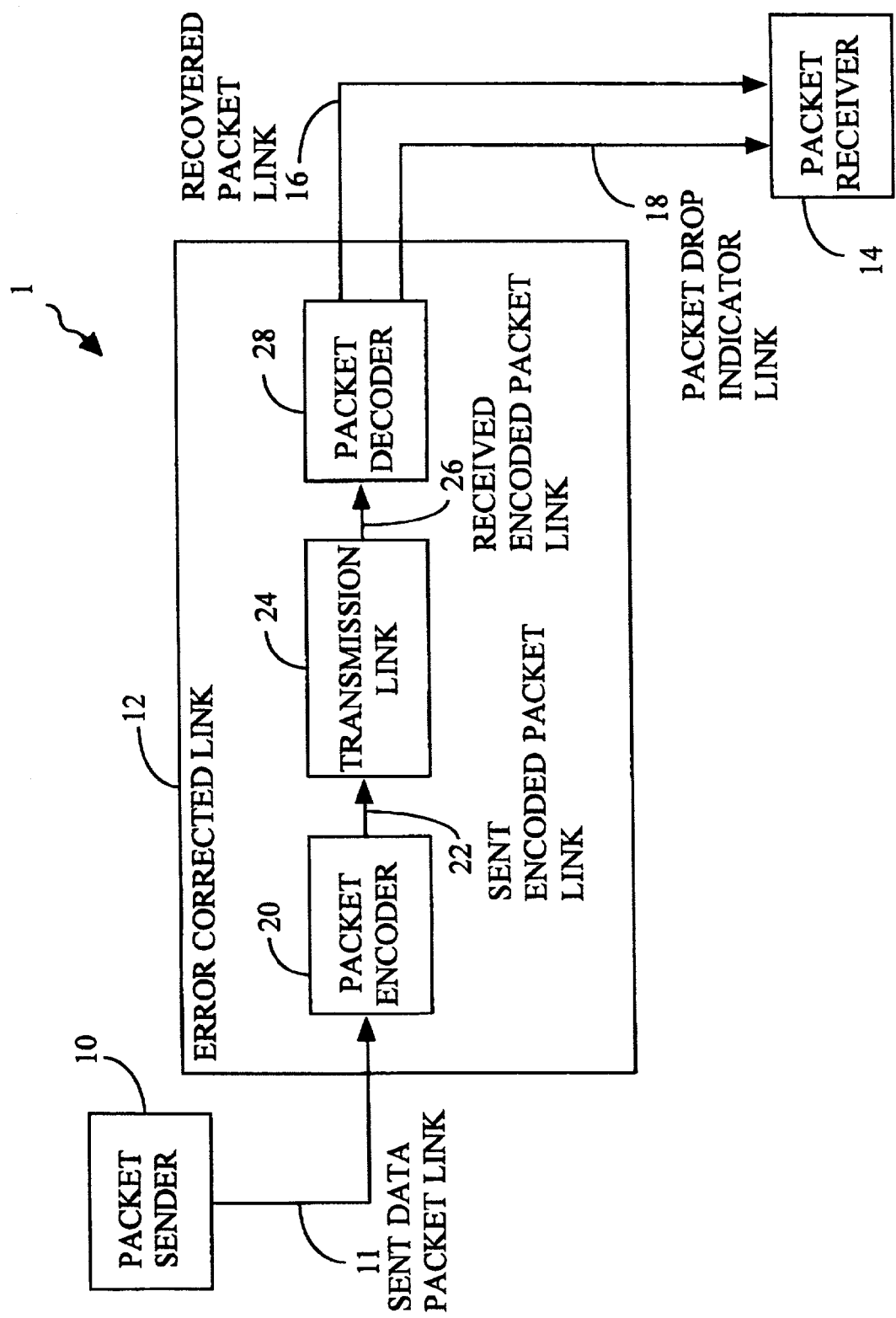
FIG. 1 illustrates a single error corrected link in a short reach interconnect system.

A high level view of an interconnect system 1 according to an embodiment of the invention is illustrated in FIG. 1, showing a Packet Sender 10 connected over a Sent Packet Link 11 to an Error Corrected Link 12. The output of the Error Corrected Link 12 is connected to a Packet Receiver 14 via two links, a Recovered Packet Link 16, and a Packet Drop Indicator Link 18. The Error Corrected Link 12 includes a Packet Encoder 20, which is connected over a Sent Encoded Packet Link 22 to a Transmission Link 24. The output of the Transmission Link 24 is connected over a Received Encoded Packet Link 26 to a Packet Decoder 28. The Packet Sender 10 transmits Sent Packets over the Sent Packet Link 11 to the Packet Encoder 20, which converts each Sent Packet into a Sent Encoded Packet by adding redundant fields to the Sent Packet. The Sent Encoded Packets are sent over the Sent Encoded Packet link 22 to the Transmission Link 24. The Transmission Link 24 forwards the Sent Encoded Packet over the Received Encoded Packet Link 26 to the Packet Decoder 28. If no line error occurs during the transmission of the encoded packet through the Transmission Link 24, the Received Encoded Packet on the link 26 is an exact copy of the Sent Encoded Packet on the link 22. However, if a line error occurs, the Received Encoded Packet on the link 26 differs from the Sent Encoded Packet on the link 22. The Packet Decoder 28 processes the Received Encoded Packet from the link 26 using the redundant fields that had been added by the Packet Encoder 20, to generate a Recovered Packet.

Figure 2:
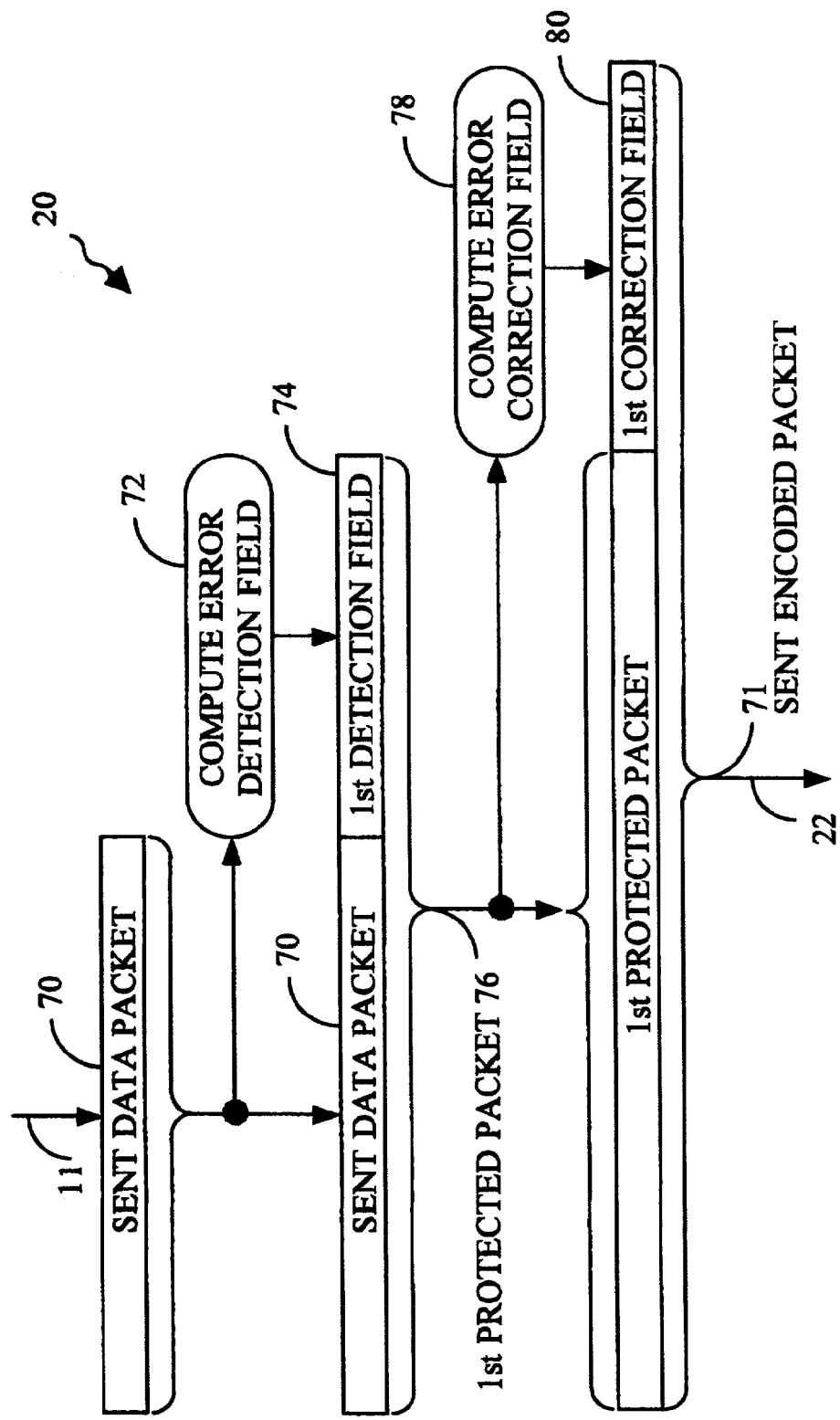
FIG. 2 is a functional diagram of a packet encoder of an embodiment of the invention.

FIG. 2 illustrates a functional diagram of the Packet Encoder 20 of the embodiment of the invention. In FIG. 2, square boxes indicate packets and fields within packets, wherein rounded boxes indicate functions, which operate on the packets and on the fields within the packets. The functions (rounded boxes) may be, e.g. implemented as logic circuits, wherein the data fields (square boxes) would illustrate register means, which hold the data bits pertaining to the packet or to the packet field, which is being processed.

The purpose of the Packet Encoder 20 is to convert a Sent data Packet 70 (received over the Sent Packet Link 11) into a Sent Encoded Packet 71 (to be sent out over the Sent Encoded Packet Link 22). In more detail, the Sent data packet 70 is received at the Packet Encoder 20 and processed by a function "Compute Error Detection Field" 72, whose input is the Sent data packet 70, and the output is a first detection field 74. The combined data of the sent data packet 70 and the detection field 74 form a first Protected Packet 76. A function "Compute Error Correction Field" 78 takes the first Protected Packet 76 as its input and provides a first correction field 80 as its output. The resulted Sent Encoded Packet 71 is simply the concatenation of the first Protected Packet 76 and the first correction field 80.

In operation, the Packet Encoder 20 adds the first Detection Field 74 to the Sent data packet 70 to form the first Protected Packet 76, where the first Detection Field 74 is computed by the "Compute Error Detection Field" function 72 which calculates an error detection code, e.g. according to a CRC or other known error checking code. As a result, the first Protected Packet 76 provides the capability for the Packet Decoder 28 to determine the integrity, or absence of errors, of a received Protected Packet by recalculating and checking the detection field. The Packet Encoder 20 further adds the Correction Field 80 to the first Protected Packet 76, where the correction field is computed by the "Compute Error Correction Field" function 78, which calculates an error correction code, e.g. a Reed-Solomon (RS) code or a 3D parity code. The resulting Sent Encoded Packet 71 provides the capability for the Packet Decoder 28, firstly to correct possible errors within the power of correction of the chosen error correction code, and secondly to determine the integrity of the corrected Protected Packet as described above.

Figure 3A:
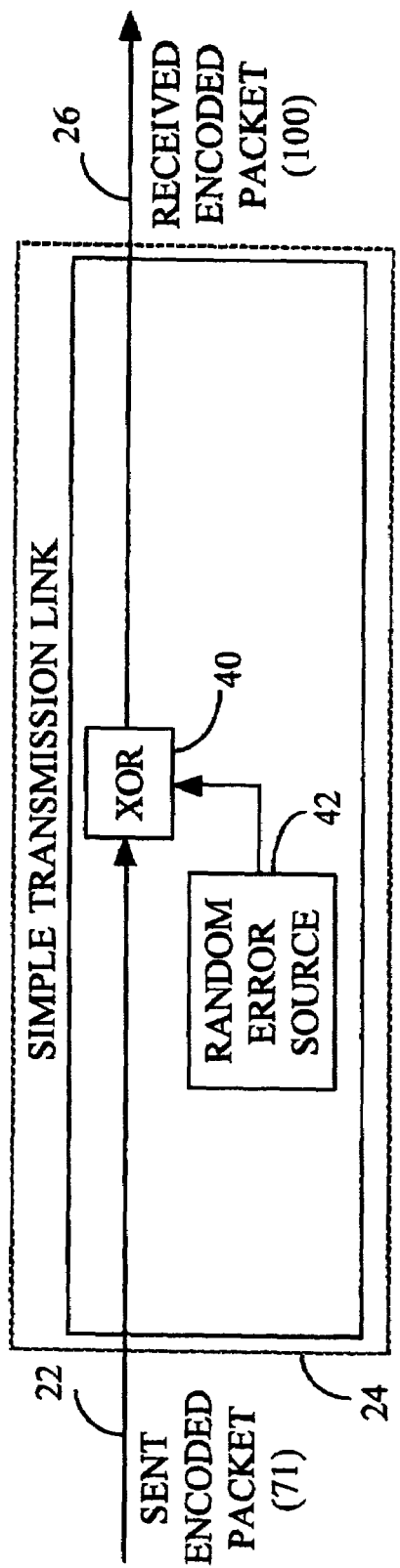
FIG. 3 shows prior art models of a transmission link in a short reach interconnect system.
Figure 3B:
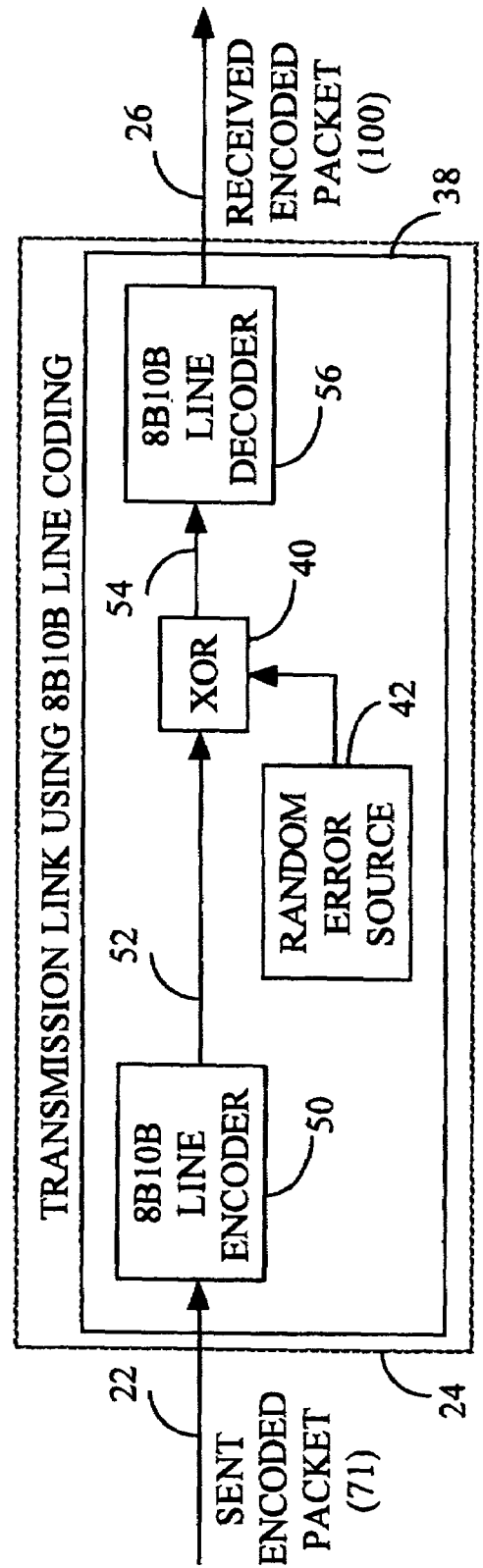

The Sent Encoded Packet 71 is to be sent through a transmission medium (transmission link). FIG. 3 illustrates two of the known models of the Transmission Link 24, a simple transmission link illustrated in FIG. 3A, and a transmission link using 8B/10B line coding illustrated in FIG. 3B. The function of an 8B/10B Line Coder 50 is to expand each 8-bit byte of the signal (carrying the Sent Encoded Packet) into a 10-bit symbol of the Sent Line Coded Signal 52. The 8B/10B Line Decoder 56 then reverses this process and maps each 10-bit symbol of the Received Line Coded Signal 54 back into the corresponding 8-bit byte, according to the 8B/10B coding rules, see e.g. A. X. Widmer and P. A. Franaszek, "A DC-Balanced, Partitioned Block, 8B/10B Transmission Code," IBM J. Res. Develop. 27, No. 5, 440–450, September 1983. Either type of the transmission link can be used in the system 1 of FIG. 1.

In the "Simple Transmission Link", an exclusive OR function (XOR) block 40 is inserted between the Sent Encoded Packet Link 22 and the Received Encoded Packet Link 26. A Random Error Source 42 is connected to a second input of the XOR block 40. It should be noted that the XOR block and the random error source are not physically part of the link, but are merely models to illustrate the effect of line errors. Each error bit received from the Random Error Source 42 causes a bit of the Sent Encoded Packet 71 to be inverted. If the random error source emits no error bit during the period when an encoded packet travels through the XOR block 40, the Received Encoded Packet 100 on the link 26 matches the Sent Encoded Packet 71 on the link 22, and no packet error occurs. If, however, N error bits are emitted by the random error source during the period when an encoded packet travels through the XOR block, the Received Encoded Packet on link 26 differs from the Sent Encoded Packet on the link 22 in N bits, and an N-bit packet error will take place.

In the "Transmission Link Using 8B/10B Line Coding", the link 22 carrying Sent Encoded Packets is connected to an 8B/10B Line Encoder 50. The output of the Line Encoder 50 is a Sent Line Coded Signal 52 connected to an XOR block 40. A second input of the XOR block 40 is connected to a Random Error Source 42. The output of the XOR block 40 is a Received Line Coded Signal 54 connected to an 8B/10B Line Decoder 56. Again, it should be noted that the XOR block and the random error source are not physically part of the link, but are merely models to illustrate the effect of line errors.

Bit errors may be introduced into the line coded signal of FIG. 3A or 3B by the Random Error Source 42 and the XOR block 40. The effect of a bit error on the line coded signal is to invert a bit in the line coded signal, causing the received line coded signal 54 to deviate from the sent line coded signal 52. When a 10-bit symbol of the deviated Received Line Coded Signal 54 is mapped into an 8-bit byte by the 8B/10B Line Decoder 56, the resulting 8-bit byte of the Received Encoded Packet 100 on the line 26 does not match the original 8-bit byte of the Sent Encoded Packet 71 on the line 22, and a byte error occurs. It should be noted that the extent of the byte error (i.e. how many of the 8 bits are in the error) depends on the detailed behavior of the 8B/10B Line Decoder 56.

Figure 4:
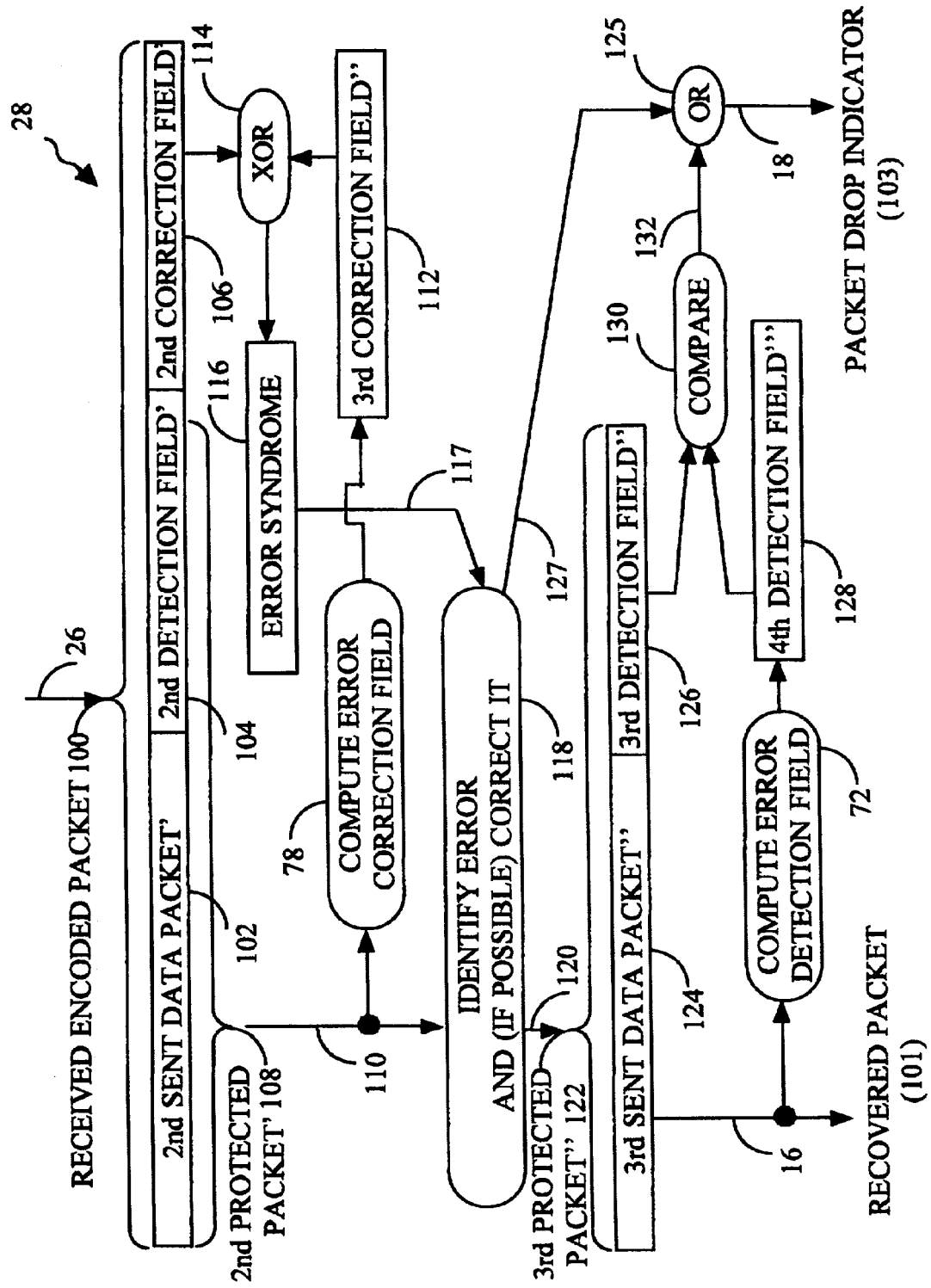
FIG. 4 is a functional diagram of a packet decoder of the embodiment of the invention.

FIG. 4 illustrates a functional diagram of the Packet Decoder 28. Similar to FIG. 3 described above, square boxes in FIG. 4 indicate packets, fields within packets and temporary fields, while rounded boxes indicate functions which operate on the packets, on the fields within packets and on the temporary fields. Related packet fields shown in FIGS. 1 and 2 carry the same names, being marked with one or more apostrophes (') to indicate that the contents of the fields may have changed due to errors introduced in the Transmission Link 24. Functions in the Packet Decoder 28 of FIG. 4, which are identical to the functions of the Packet Encoder 20 of FIG. 2, are designated by the same reference numerals. Similar to the Packet Encoder 20 of FIG. 2, the functions (rounded boxes) of the packet decoder 28 of FIG. 4 may be implemented as logic circuits, and the data fields (square boxes) represent register means, which hold the data bits pertaining to the packet or the packet field being processed.

The purpose of the Packet Decoder 28 is to convert the Received Encoded Packet 100 received over the Received Encoded Packet Link 26 into a Recovered Packet 101 to be sent out over the Recovered Packet Link 16, and to provide the Packet Drop Indicator 103 on the drop Packet Drop Indicator Link 18. The Received Encoded Packet 100 has the same format as the Sent Encoded Packet 71 in FIG. 2. The three constituent fields of the Received Encoded Packet 100 are called Second data Packet' 102, second Detection Field' 104, and second Correction Field' 106. The names of the fields are marked with an apostrophe to indicate that, although nominally containing the same bit values as the corresponding fields in the Sent Encoded Packet 71, some of the bits may have changed due to errors in the Transmission Link 24.

The term second Protected Packet' 108 is used to describe the combination of the second data Packet' 102 and the second Detection Field' 104. The function "Compute Error Correction Field" 78 receives the second Protected Packet' 108 over line 110 and produces a third Correction Field'' 112 as its output. An XOR function 114 receives the second Correction Field' 106 contained in the Received Encoded Packet 100 and the third Correction Field'' 112 as its inputs and generates a temporary Error Syndrome value 116 as its output. The Error Syndrome value 116 is used as a first input 117 to a function 118 named "Identify Error And (If Possible) Correct It", and a second input to the function 118 is the second Protected Packet' 108 provided over the link 110. The function 118 has two outputs, the first output 120 is connected to the third Protected Packet" 122, which is the combination of the fields 124 (Third data Packet") and 126 (third Detection Field"), and the second output 127 is connected to an OR function 125 whose output is the packet drop indicator 103 sent on packet drop indicator link 18 (FIG. 1). The third data Packet" field 124 is connected to the input of the "Compute Error Detection Field" function 72, the output of which is connected to a fourth Detection Field'" 128. A "Compare" function 130 has the third Detection Field" 126 and the fourth Detection Field'" 128 as its inputs, the output 132 of the function 130 being connected to said OR function 125, whose output is the packet drop indicator 103. The third data Packet" field 124 is connected via the output line 16 to the Recovered Packet 101 of the Packet Decoder 28, the recovered packet 101 being a copy of the sent data packet 70.

In operation, the second Protected Packet' 108 (the contents of the second data Packet' 102 and of the second Error Detection Field' 104 of the Received Encoded Packet 100), is processed by the "Compute Error Correction Field" function 78 to yield the third Correction Field" 112. The function 78 in the Packet Decoder 28 operates in the same manner as the corresponding function 78 in the Packet Encoder 20, where the XOR function 114 performs the logical XOR operation pairwise on the corresponding bits of the second Correction Field' 106 and the third Correction Field" 112 to yield the Error Syndrome value 116. If the Received Encoded Packet 100 suffers no error during its passage through the Transmission Link 24, the two correction fields (106 and 112) will be equal, and all bits of the Error Syndrome 116 will be zero. On the other hand, if the bits of the Error Syndrome field 116 are not all zero, an error occurs, which may be correctable. The "Identify Error And (If Possible) Correct It" function 118 evaluates the Error Syndrome value 116 by using one of the error correction codes, e.g. ECC, and determines if the error is correctable. If the error is not correctable, the line 127 is activated, and the Packet Drop Indicator 103 indicates that an invalid packet has been received. If the error is correctable, the bits in the error are identified and corrected, with the third Protected Packet" 122 including the third Packet" field 124 and the third Detection Field" 126 being the output of the correction procedure. The "Compute Error Detection Field" function 72 takes the third data Packet" 124 as its input to calculate the fourth Detection Field'" 128. The function 72 in the Packet Decoder 28 operates in the same manner as the corresponding function 72 in the Packet Encoder 20. The Compare function 130 compares the recomputed fourth Detection Field'" 128 with the received and possibly error corrected third Detection Field" 126, where the Equality of the two fields indicates the integrity of the third Protected Packet" 122. Thus, the third data Packet" field 124 of the third Protected Packet" 122 is a corrected copy of the original Sent data Packet 70 of FIG. 2, and which is sent over the line 16 as the Recovered Packet 101. If the Compare function 130 reports inequality, it indicates that the third Protected Packet" 122 contains an error and, the Packet Drop Indicator 103 is activated through the lines 132 and 18.

Thus, to summarize the foregoing, the method of digital data transmission of the embodiment of the invention envelops the sent packet data, first with an error detection scheme, and secondly with an error correction scheme. The error correction applies to both the sent packet data and to the error detection field. If an error in either of these fields occurs, the error correction scheme attempts to correct it. Error correction may fail in which case the packet is dropped. If error correction does not fail, there is still a possibility that there was an error which error correction did not correct correctly, or did not detect at all because the power of the correction scheme was exceeded. In these cases, the error detection scheme provides a method or means to detect such errors and drop the packet.

Figure 5:
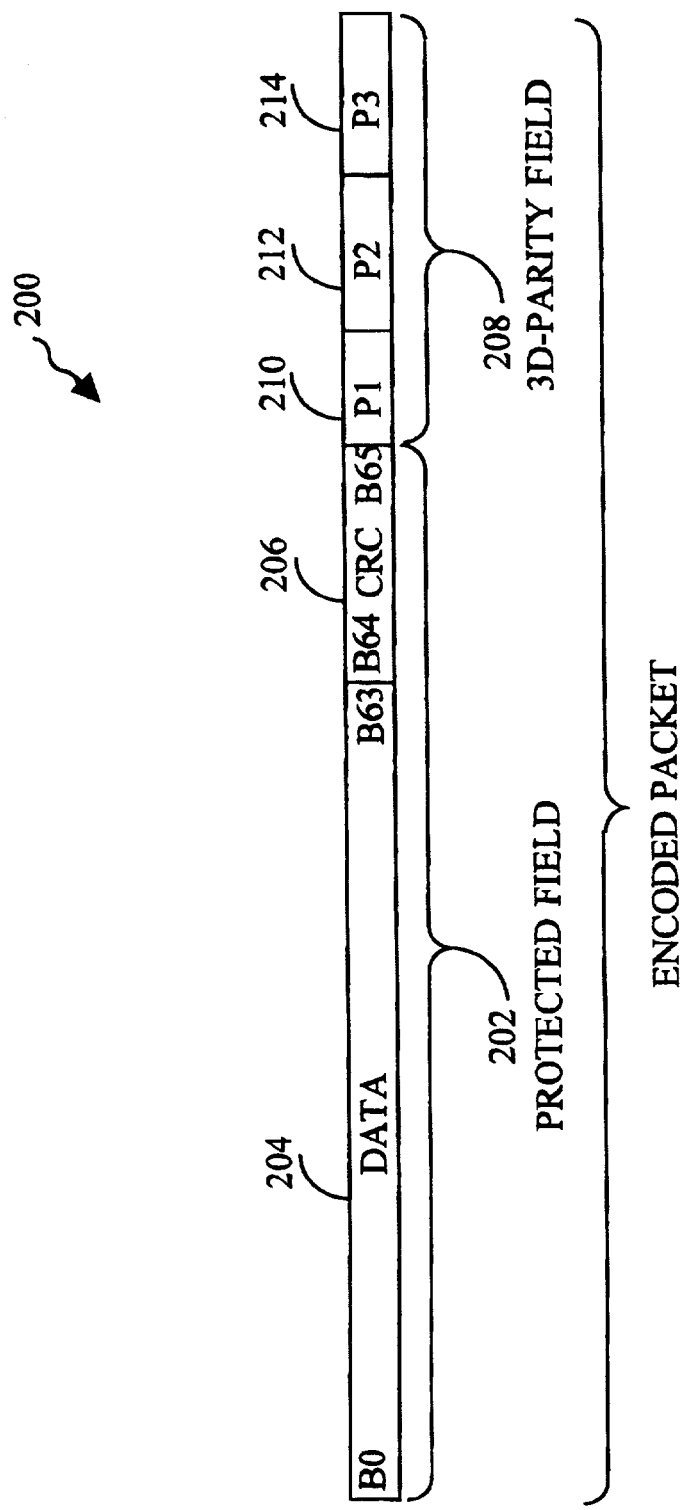
FIG. 5 shows a format of an encoded packet in more detail.

FIG. 5 shows a detailed packet format 200 of an encoded packet of the embodiment of the invention, the encoded packet being one of the Sent Encoded Packet or Received Encoded Packet. As shown in FIG. 5, an Encoded Packet 200 contains a Protected Field 202 of 66 eight-bit bytes, of which the first 64 bytes (data 204) are numbered B0 to B63, and the last 2 bytes (CRC 206) are numbered B64 and B65. The Encoded Packet 200 also contains a 3D-Parity Field 208 which is subdivided into three parity sub fields, P1 (210), P2 (212) and P3 (214).

The Data field 204 corresponds to the Sent data Packet 70 of the Sent Encoded Packet 71, as well as the second data packet' 102 of the Received Encoded Packet 100. The CRC field 206 corresponds to the Detection Field 74 of the Sent Encoded Packet 71, as well as the second Detection' Field 104 of the Received Encoded Packet 100. The 3D-Parity Field 208 corresponds to the Correction Field 80 of the Sent Encoded Packet 71, as well as the second Correction Field' 106 of the Received Encoded Packet 100.

FIG. 6 shows an alternative visualization and a memory layout of the 66-bytes of data of the Protected Field 202 of the preferred embodiment, displayed as a 2-dimensional array of bytes. This array contains eight rows, numbered 0 to 7, and nine columns, numbered 0 to 8. The 66 bytes (numbered B0 to B65) of the Protected Field 202 are disposed in the array such that the byte at the intersection of row R and column C is the byte Bx, where x=R+8*C. The last 6 bytes in column 8 would be B66 to B71. However they are not shown because they are not part of the Protected Field 202.

Figure 7:
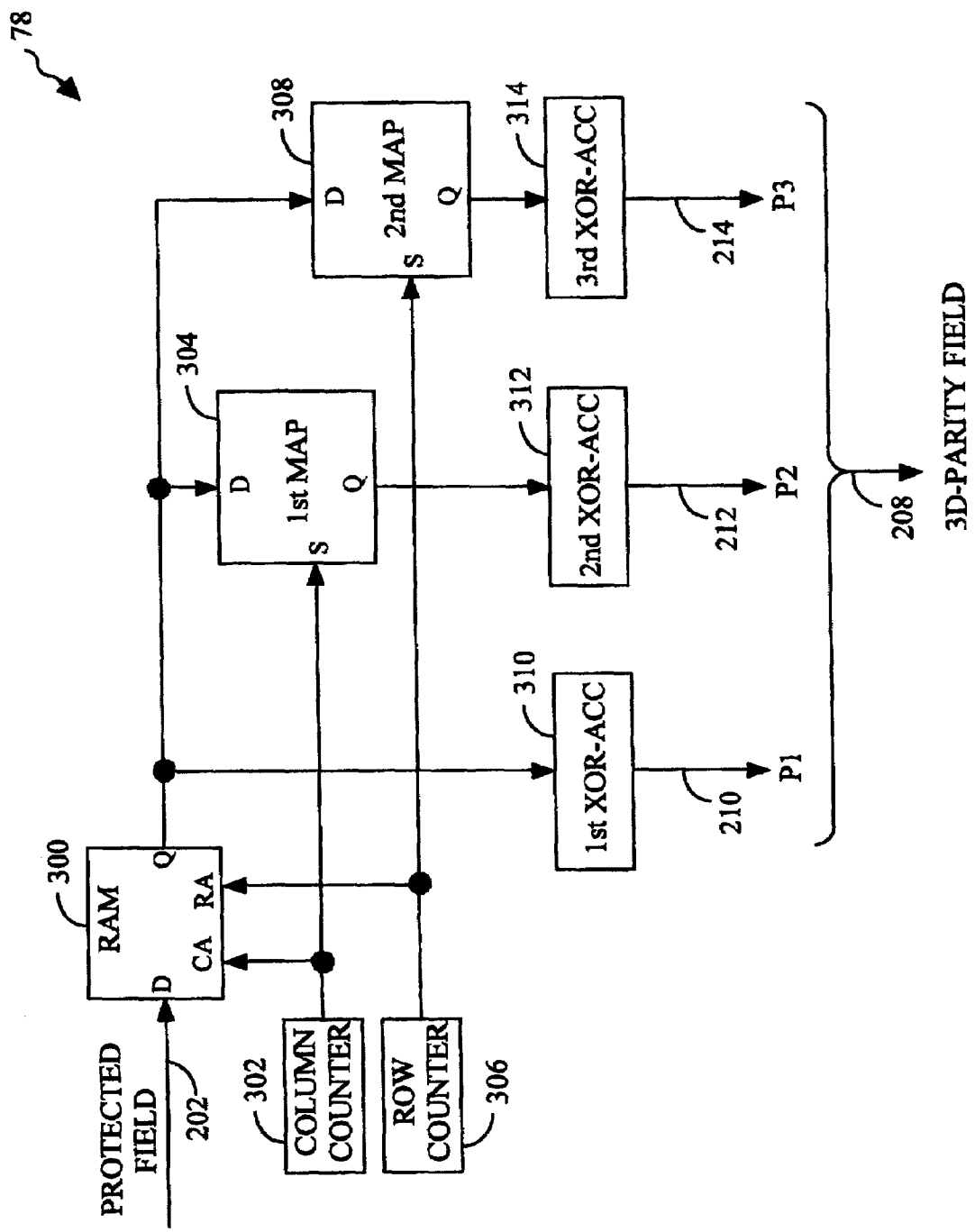
FIG. 7 is a detailed diagram of the function "Compute Error Correction Field" 78 of FIGS. 2 and 4.

FIG. 7 shows a detailed diagram of the function "Compute Error Correction Field" 78 of FIGS. 2 and 4. The link from the Protected Field 202 is connected to the data input D of a random access memory (RAM) 300. The output of a column counter 302 is connected to the column address input CA of the RAM 300, and to the select input S of a first code mapper (MAP) 304. The output of a Row Counter 306 is connected to the row address input RA of the RAM 300 and to the select input S of a second code mapper (MAP) 308. The data output Q of the RAM 300 is connected to the input of a first XOR-accumulator (XOR-ACC) 310, which is used for accumulating the bitwise parity of a multi-word data stream.

A code mapper MAP 304 is illustrated in more detail with the aid of FIG. 8, which shows a table indicating the mapping of input data bits (d1 to d8 of the data input D of MAP), to output bits (of the output Q of MAP), as a function of the select input value (select=0 to 8). Each row of the table displays the output data bits that form the output word (output Q of MAP) for one select input value. Conveniently, an entry of 0 in the table indicates a padding bit which is set to 0, all other output bits are set to the value of the respective indicated input bit. Note that the input word is eight bits wide while the output word is eleven bits wide. A mapper may be constructed by persons skilled in the art as a static logic circuit, or as a dynamic circuit, to obtain the specified translation of the input data word.

The data output Q of the RAM 300 is also connected to the data input D of the first MAP 304 and to the data input D of the second MAP 308. The output Q of the first MAP 304 is connected to the input of a second XOR-accumulator (XOR-ACC) 312, and the output Q of said second MAP 308 is connected to the input of a third XOR-accumulator (XOR-ACC) 314. The outputs of the XOR-accumulators 310, 312, and 314 form the three parity sub fields P1 (210), P2 (212), and P3 (214), which are combined into the 3D-Parity Field 208.

In operation, at the start of a packet encoding cycle, the Column Counter 302, the Row Counter 306 and the XOR-accumulators (XOR-ACC) 310, 312, and 314 are reset, and the RAM 300 is loaded with the data of the Protected Field 202. The data bytes of the Protected Field 202 are organized in the RAM 300 to be addressable by column and row as shown in FIG. 6, the byte addressing being obtained from the outputs of the Column Counter 302 and the Row Counter 306. A packet encoding cycle extends over 66 clock periods which are counted out by the column and row counters to address each of the bytes of the Protected Field 202 which are stored in RAM 300. During each clock period, a different one byte of the Protected Field 202 is present at the data output D of the RAM 300, and consequently at the input of the first XOR-accumulator 310 and at the data inputs D of the first and second code mappers 304 and 308, and the parity sub-field P1 (210) is generated in the first XOR-accumulator 310 by the direct accumulation of the bytes of the Protected Field 202. Similarly, the parity sub-field P2 (212) is generated in the second XOR-accumulator 312 by the accumulation of the data words, which result from the translation of the bytes of the protected field 202 through the first mapper MAP 304, and the parity sub-field P3 (214) is generated in the third XOR-accumulator 314 by the accumulation of the data words which result from the translation of the bytes of the protected field 202 through the second mapper MAP 308, the 3D-Parity Field 208 being the concatenation of the three parity sub fields P1, P2, and P3. Note that even though both parity sub fields P1 and P2 are obtained using the same data bytes, translated by mappers of identical functionality, the select inputs of the two mappers are connected to different sources, the column and the row counters respectively. For each period of the encoding cycle, a unique combination of column and row values exists, and P1, P2 and P3 are accumulated differently.

Figure 9:
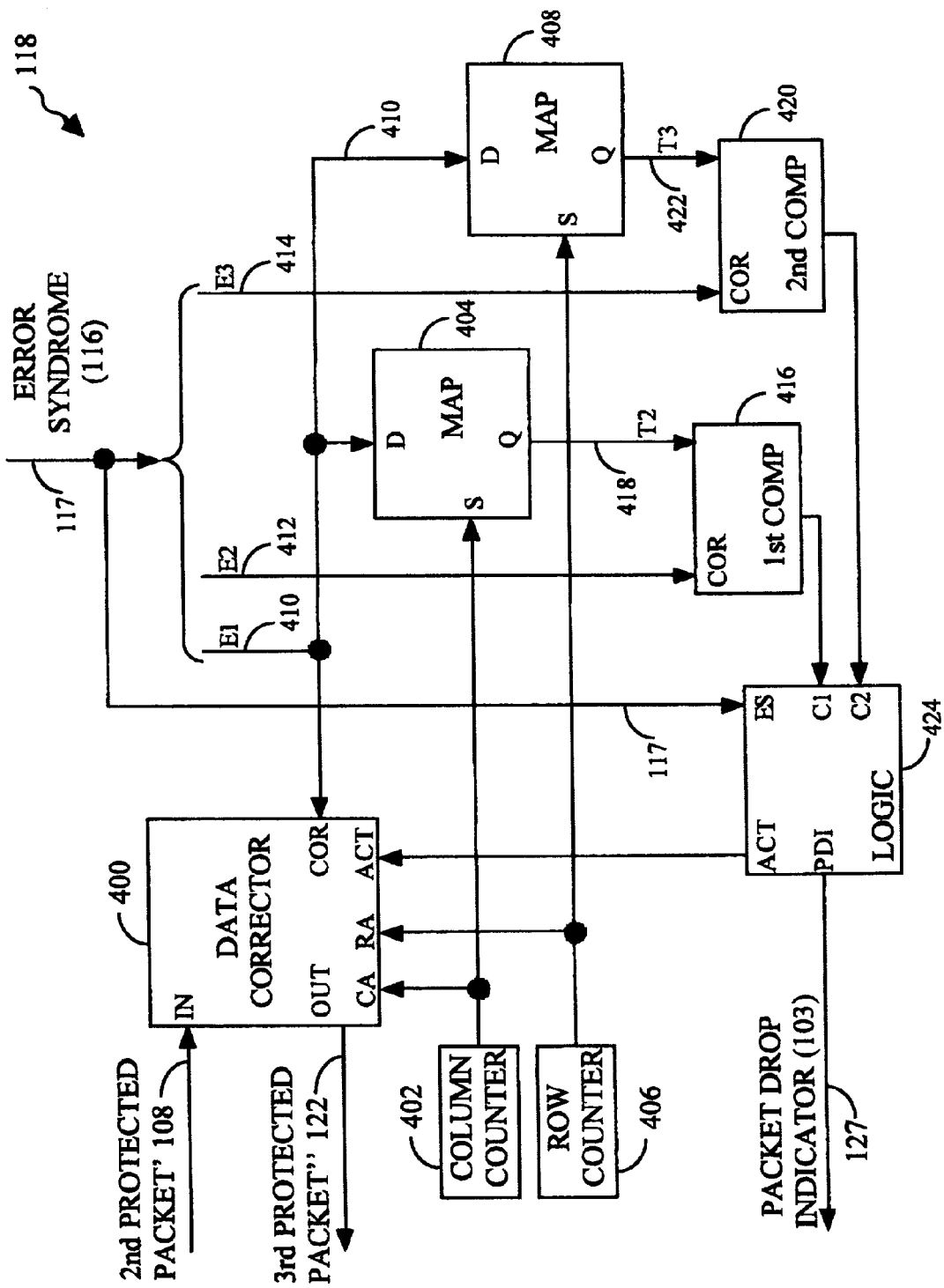
FIG. 9 is a detailed diagram of the function "Identify Error And (If Possible) Correct It" 118 of FIG. 4.

FIG. 9 shows a detailed structure of the function "Identify Error And (If Possible) Correct It" 118 of FIG. 4.

The data line of the protected field' 108 is connected to the data input "IN" of a Data Corrector 400. The Data Corrector 400 includes a memory, e.g. a random access memory, to store data bytes in a row and column format. The memory can be written through data input "IN" and read through data output "OUT" of the data Corrector 400. The Data Corrector 400 further has the ability to modify a data byte stored in its memory and addressed by column address (CA) and row address (RA) when an activation input "ACT" is activated. After the correction, the value of the data byte is its original value, which is XORed with the bit pattern present at the correction "COR" input of the Data Corrector 400. The correction of a data byte "B" may be expressed by the formula B_corrected=B_old XOR "COR", where XOR is the bit-wise XOR function.

The output OUT of the Data Corrector 400 is connected to the third Protected Packet" 122. A Column Counter 402 is connected to the column address input "CA" of the Data Corrector 400 and to the select input "S" of a code mapper (MAP) 404. A Row Counter 406 is connected to the row address input "RA" of the Data Corrector 400 and to the select input "S" of another code mapper (MAP) 408. The Error Syndrome field 117 is split into three error syndrome sub-fields E1 (410), E2 (412), and E3 (414) in the same proportion as the 3D-parity field 208 of FIG. 5 is split into the three parity sub-fields P1, P2, and P3. The error syndrome sub-field E1 (410) is connected to the correction input "COR" of the Data Corrector 400 and to the data inputs "D" of the code mappers 404 and 408. The error syndrome sub-field E2 (412) is connected to a first input "COR" of a first comparator (COMP) 416, and the data output Q of the code mapper 404 is connected to a second input of the comparator 416 through line 418. Similarly, the error syndrome sub-field E3 (414) is connected to a first input "COR" of a second comparator (COMP 420), the data output "Q" of the mapper 408 being connected to the second input of the comparator 420 through line 422. A logic circuit (LOGIC 424) has three inputs labeled "ES", "C1" and "C2" correspondingly. The error syndrome value 116 is connected though line 117 to the input ES of the logic circuit 424, the output of the first comparator 416 is connected to the input "C1" of the logic circuit 424, and the output of the second comparator 420 is connected to the input "C2" of the logic circuit 424. An activation output "ACT" of the logic circuit 424 is connected to the "ACT" input of the Data Corrector 400. A Packet Drop Indicator 103, which is output (PDI) of the logic circuit 424, is connected to the Packet Drop Indicator line 127.

The function "Identify Error And (If Possible) Correct It" 118 processes the Error Syndrome value 116 and determines if a correction is possible, and if so, performs the correction and activates the Packet Drop Indicator 103 otherwise.

The 3D-parity scheme described above is capable of correcting a single byte that is in error. It means that it is able to correct individual bit errors when the transmission link is the Simple Transmission Link of FIG. 3A as well as individual byte errors, which is necessary when the transmission link is the Transmission Link Using 8B/10B Line Coding of FIG. 3B.

The Error Syndrome value 116 received on link 117 has the information necessary to enable this correction. However if an uncorrectable error occurs, this will not always be evident until the error correction procedure has been attempted.

One class of uncorrectable errors can be detected immediately by the logic circuit 424 through inspection of the Error Syndrome field 117 in the following manner. If the number of bits set in each of the sub fields E1, E2 and E3 are not equal, then an uncorrectable error has occurred, and the Packet Drop Indicator output (PDI) may be activated by the logic circuit 424. If all bits of the Error Syndrome value 116 are zero, then no error has been detected, and no correction is necessary.

In all other cases, error correction will be attempted as follows. At the start of the correction cycle, the received second Protection Packet' 108 is loaded into the memory of the Data Corrector 400. The Column Counter 402 and the Row Counter 406 are reset, and the Error Syndrome field 116 is available as an input to the correction function 118. In a column scan, the Column Counter 402 is incremented from the reset position of 0 in steps of 1, until either the maximum count of 8 is reached, or the output of the first comparator 416 indicates a match between the error syndrome sub-field E2 on line 412 and the output T2 of the mapper 404 on line 418. If no match is found from the column scan, then the packet drop indicator output (PDI) will be activated by the logic circuit 424 as no correction is possible. If a match is found, the column counter 402 will stop at the column (the error column) in which a correctable error may be found.

The row in which the error is located can be found in the following manner. In a row scan, the Row Counter 406 is incremented from the reset position of 0 in steps of 1, until either the maximum count of 7 is reached, or the output of the second comparator 420 indicates a match between the error syndrome sub-field E3 on line 414 and the output T3 of the mapper 408 on line 422. If no match is found from the row scan, then the packet drop indicator output (PDI) will be activated by the logic circuit 424 as no correction is possible. If the match was found, the row counter 406 will stop at the row (the error row) in which a correctable error has been found. The error byte is the byte located at the intersection of the error row and the error column.

To effect the actual correction of the error, the logic circuit 424 activates its activate (ACT) output which is connected to the ACT input of the data corrector 400, and upon activation of the "ACT" input, the Data Corrector 400 modifies the data byte in the location addressed through the error column applied at the column address (CA) input, and the error row applied at the row address (RA) input, by XORing the addressed data byte with the bit pattern of the error syndrome sub-field E1 which is connected to the "COR" input of the data corrector 400.

Thus, a method and system for transmitting digital data in a form of packets through a transmission medium with error correction is provided.

Modifications to the error correction function "Identify Error And (If Possible) Correct It" 118 are possible without deviating from the substance of the correction procedure. For example, the error syndrome sub-fields E2 and E3 may be reverse mapped under control of the column and row counters, and the comparisons made between the error syndrome sub-fields E1 and the results of the reverse mappings of E2 and E3. Alternatively, the row and column counters may be interchanged in their functions in both the encoder 20 and decoder 28. Yet alternatively, the column scan and the row scan may be run simultaneously, without one scan waiting for the other to be completed. These and other modifications may be readily made by persons skilled in the art in order to adapt the design.

It is also contemplated that alternative coding methods may be used instead of CRC-16 code used in the embodiment of the invention. For example, CRC-32, "checksum" methods of error detection or other codes suitable for error correction such as Reed-Solomon (RS) codes may be used for error correction functions 78 and 118, which may provide the ability to correct a larger number of packet errors.

Although the embodiment of the invention was illustrated with regard to the transmission link providing 8B/10B line coding, it is understood that, in general, the transmission link may comprise a line encoder for transforming each "p" bits of sent encoded data packets into "q" bits, "q" being not less than "p", and a line decoder for transforming each of the received "q" bits into "p" bits of the received encoded data packets.

Alternatively to the 3D parity calculation in the error correction scheme, an N-dimensional parity calculation may be performed if required.

Although specific embodiments of the invention have been described in detail, it will be apparent to one skilled in the art that variations and modifications to the embodiments may be made within the scope of the following claims.

What is claimed is:

1. A method for transmitting digital data in a form of packets through a transmission medium with error correction, each packet being formatted as a fixed number of data words, each data word having more than 1 bit, the method comprising the steps of:
   (a) encoding a sent data packet to form a sent encoded data packet having an "M" eight-bit bytes Protected Packet and an "n" D-parity field;
   (b) transmitting the sent encoded data packet through the transmission medium, which may introduce errors into the packet during the transmission, the sent encoded data packet being received as a received encoded data packet at the output of the transmission medium, the received encoded data packet having an "M" eight-bit bytes Protected Packet and an "n" D-parity field, the Protected Packet comprising the sent data packet of the sent encoded data packet and a data packet of the received encoded data packet;
   (c) checking for errors in the data of the Protected Packet of the received encoded data packet, and if an error occurred, applying an error correction scheme for computing an error correction field for said error and inserting said error correction field in the "n" D-parity field;
   (d) computing, for said error correction field, an error Syndrome field having "k" error syndrome subfields, and if numbers of bits in the "k" error syndrome subfields are equal, applying the error correction field to correct the error of the sent data packet, otherwise, dropping the sent data packet; and
   (e) decoding the received encoded data packet to recover a copy of the sent data packet.

2. A method as described in claim 1, wherein the step (a) comprises encoding the sent data packet to form the sent encoded data packet having the "M" eight-bit bytes Protected Packet, wherein the Protected Packet has data fields having "x" bytes of data, and a cyclic redundancy code (CRC) field having "y" bytes such tha "x+y" equals to "M".

3. A method as described in claim 2, wherein the step of correcting errors comprises correcting one or more errors occurred in a single data word of the Sent Encoded Packet only.

4. A method as described in claim 2, wherein the CRC field comprises a detection field of the sent encoded data packet and a detection field of the received encoded data packet.

5. A method as described in claim 2, wherein "M"=66, "x"= 64, and "y"=2.

6. A method as described in claim 1, wherein the step (c) further comprises calculating data parity in the "n" D-parity field, and wherein "n" equals to three (3).

7. A method as described in claim 6, wherein the "n" D-parity field comprises a correction field of the sent encoded data packet and a correction field of the received encoded data packet.

8. A method as described in claim 1, wherein the step (d) comprises generating a packet drop indicator signal if the power of the correction scheme is exceeded and the correction scheme cannot correct errors.

9. A method as described in claim 8, wherein the step (d) comprises generating a packet drop indicator signal if the integrity of the data of said Protected Packet is not confirmed.

10. A method as described in claim 1, wherein the step (d) comprises applying an algebraic function to the data words in the data of said Protected Packet to generate respective error correction fields for the sent data packet of the sent encoded data packet and the data packet of the received encoded data packet.

11. A method as described in claim 10, wherein the step of applying the algebraic function comprises performing a N-dimensional parity calculation.

12. A method as described in claim 11, wherein the step of applying N-dimensional parity calculation comprises performing a 3D (three dimensional) parity calculation.

13. A method as described in claim 12, wherein the transmitting of data is performed so that each data word is an 8-bit byte, and each data packet has not more than 64 bytes.

14. A method as described in claim 9, wherein the step of determining the integrity of the data of said Protected Packet comprises:
(n) applying said error detection scheme to the data of the sent data packet of the sent encoded data packet and the data packet of the received encoded data packet of said Protected Packet to generate respective detection fields;
(p) comparing the generated detection fields; and
(q) confirming the integrity of the data of the Protected Packet, if the generated detection fields are equal.

15. A method as described in claim 1, wherein the step (d) comprises:
(k) applying an algebraic function to the data words in the data of said Protected Packet to generate respective error correction fields for the sent data packet of the sent encoded data packet and the data packet of the received encoded data packet;
(l) applying a bitwise exclusive OR function to said generated error correction fields to obtain corresponding error syndrome values, and if an error occurred, identifying the data word which has the error and obtaining a bit pattern of the error from the error syndrome values; and
(m) correcting the identified word in the data of said Protected Packet by using the obtained bit pattern to obtain a corrected Protected Packet.

16. A method as described in claim 1, wherein the step (c) comprises applying an algebraic function to the data words in the sent data packet of the Protected Packet to generate a detection field.

17. A method as described in claim 16, wherein the step of applying the algebraic function comprises applying one or more of the following functions: CRC-16, CRC-32 and a checksum.

18. A method as described in claim 1, wherein transmitting of the sent encoded data packet through the transmission medium comprises transmitting said packet through the transmission link.

19. A method as described in claim 18, wherein transmitting the sent encoded data packet through the transmission link comprises transmitting said packet through the link which provides line coding of the transmitted data.

20. A method as described in claim 19, wherein the transmitting the packet through the line coded link comprises transmitting the packet through the link, which provides 8B/10B line coding.

21. A system for transmitting digital data in a form of packets through a transmission medium with error correction, each packet being formatted as a fixed number of data words, each data word having more than 1 bit, the system comprising:
(1) an encoder, encoding a sent data packet to form a sent encoded data packet having an "M" eight-bit bytes Protected Packet and an "n" D-parity field;
(2) a transmitter, transmitting the sent encoded data packer through the transmission medium, which may introduce errors into the packet during the transmission, the sent encoded data packet being received as a received encoded data packet at the output of the transmission medium, the received encoded data packet having an "M" eight-bit bytes Protected Packet and an "n" D-parity field, the Protected Packet comprising the sent data packet of the sent encoded data packet and a data packet of the received encoded data packet;
(3) a detector, checking for errors in the data of the Protected Packet of the received encoded data packet, and if an error occurred, applying an error correction scheme for computing an error correction field for said error and inserting said error correction field in the "n" D-parity field;
(4) a corrector, computing, for said error correction field, an error Syndrome field having "k" error syndrome subfields, and if numbers of bits in the "k" error syndrome subfields are equal, applying the error correction field to correct the error of the sent data packet, otherwise, dropping the sent data packet; and
(5) a decoder, decoding the received encoded data packet to recover a copy of the sent data packet.

22. A system as described in claim 21, wherein the corrector comprises means for correcting errors in the data of the Protected Packet of the received encoded data packet.

23. A system as described in claim 22, wherein the corrector further comprises means for storing the "M" eight-bit bytes Protected Packet in a two-dimensional array of bytes.

24. A system as described in claim 23, wherein the corrector has a random access memory for storing the two-dimensional array of bytes of the "M" eight-bit bytes Protected Packet.

25. A system as described in claim 22, wherein the means for correcting errors comprises means for correcting one or more errors occurred in a single data word of the Sent Encoded Packet only.

26. A system as described in claim 21, wherein the corrector comprises means for generating a packet drop indicator signal if the power of the correction scheme is exceeded and the correction scheme cannot correct errors.

27. A system as described in claim 26, wherein the corrector further comprises means for generating a packet drop indicator signal if the integrity of the data of said Protected Packet is not confirmed.

28. A system as described in claim 26, wherein the corrector comprises means for applying an algebraic function to the data words in the data of said Protected Packet to generate respective error correction fields for the sent data packet of the sent encoded data packet and the data packet of the received encoded data packet.

29. A system as described in claim 28, wherein the means for applying the algebraic function comprises means for performing a N-dimensional parity calculation.

30. A system as described in claim 29, wherein the means for performing the N-dimensional parity calculation comprises means for performing a 3D (three dimensional) parity calculation.

31. A system as described in claim 30, wherein each data word is an 8-bit byte, and each data packet has not more than 64 bytes.

32. A system as described in claim 21, wherein the corrector comprises:
(w) means for applying an algebraic function to the data words in the data of said Protected Packet to generate error correction fields for the sent data packet of the sent encoded data packet and the data packet of the received encoded data packet, respectively;

(x) means for applying bitwise exclusive OR function to said generated error correction fields to obtain corresponding error syndrome values;

(y) means for identifying the data word which has the error, if any, and means for obtaining a bit pattern of the error from the error syndrome values; and (z) means for correcting the identified word in the data of said Protected Packet by using the obtained bit pattern to obtain a corrected Protected Packet.

33. A system as described in claim 27, wherein the means for determining the integrity of the data of said Protected Packet comprises:

(i) means for applying said error detection scheme to said data of the sent data packet of the sent encoded data packet and the data packet of the received encoded data packet of said Protected Packet to generate respective detection fields;

(ii) means for comparing the generated detection fields; and (iii) means for confirming the integrity of the data of the Protected Packet, if the generated detection fields are equal.

34. A system as described in claim 21, wherein the detector comprises means for applying an algebraic function to the data words in the sent data packet of the Protected Packet to generate a detection field.

35. A system as described in claim 34, wherein the means for applying the algebraic function comprises means for applying one or more of the following functions: CRC-16, CRC-32 and a checksum.

36. A system as described in claim 21, wherein the transmission medium comprises a transmission link.

37. A system as described in claim 36, wherein the transmission link comprises a line encoder for transforming each "p" bits of said sent encoded data packets into "q" bits, "q" being not less than "p", and a line decoder for transforming each of the received "q" bits into "p" bits of said received encoded data packets.

38. A system as described in claim 37, wherein "p"=8 and "q"=10.

39. An encoder for the system described in claim 21 for transmitting digital data in a form of packets through a transmission medium with error correction, comprising:

(6) a detector, adding an error detection field to the Protected Packet of the sent encoded data packet;

(7) a corrector, adding a respective error correction field to the Protected Packet of the sent encoded data packet; and (8) a transmitter, sending the sent encoded data packet to the transmission medium.

40. An encoder as described in claim 39, wherein the means for adding the error correction field comprises means for applying 3D parity calculation to the Protected Packet.

41. An encoder as described in claim 39, wherein the means for adding the error detection field comprises means for adding the error detection field according to one the schemes: CRC-16, CRC-32 and checksum.

42. A system as described in claim 21, wherein the detector comprises means for calculating data parity in the "n" D-parity field, and wherein "n" equals to three (3).

43. A decoder for the system described in claim 21 for receiving digital data in a form of packets from the transmission medium with error correction, the decoder comprising:

(iv) a receiver, receiving the received encoded data packet from the transmission medium; and (v) a corrector, correcting errors, if any, in the received encoded data packet to recover a corrected Protected Packet which includes fields from the Protected Packet with the errors being corrected; and (vi) a detector, determining integrity of the data of the corrected Protected Packet; and recovering a corrected data packet from the corrected data of the Protected Packet, the corrected data packet being a copy of the sent data packet.

* * * * *